Sept. 1, 1953          R. J. STEHLING          2,650,710
MACHINE FOR REMOVING DEBRIS FROM SOLUTIONS
Filed Jan. 24, 1951          3 Sheets-Sheet 2
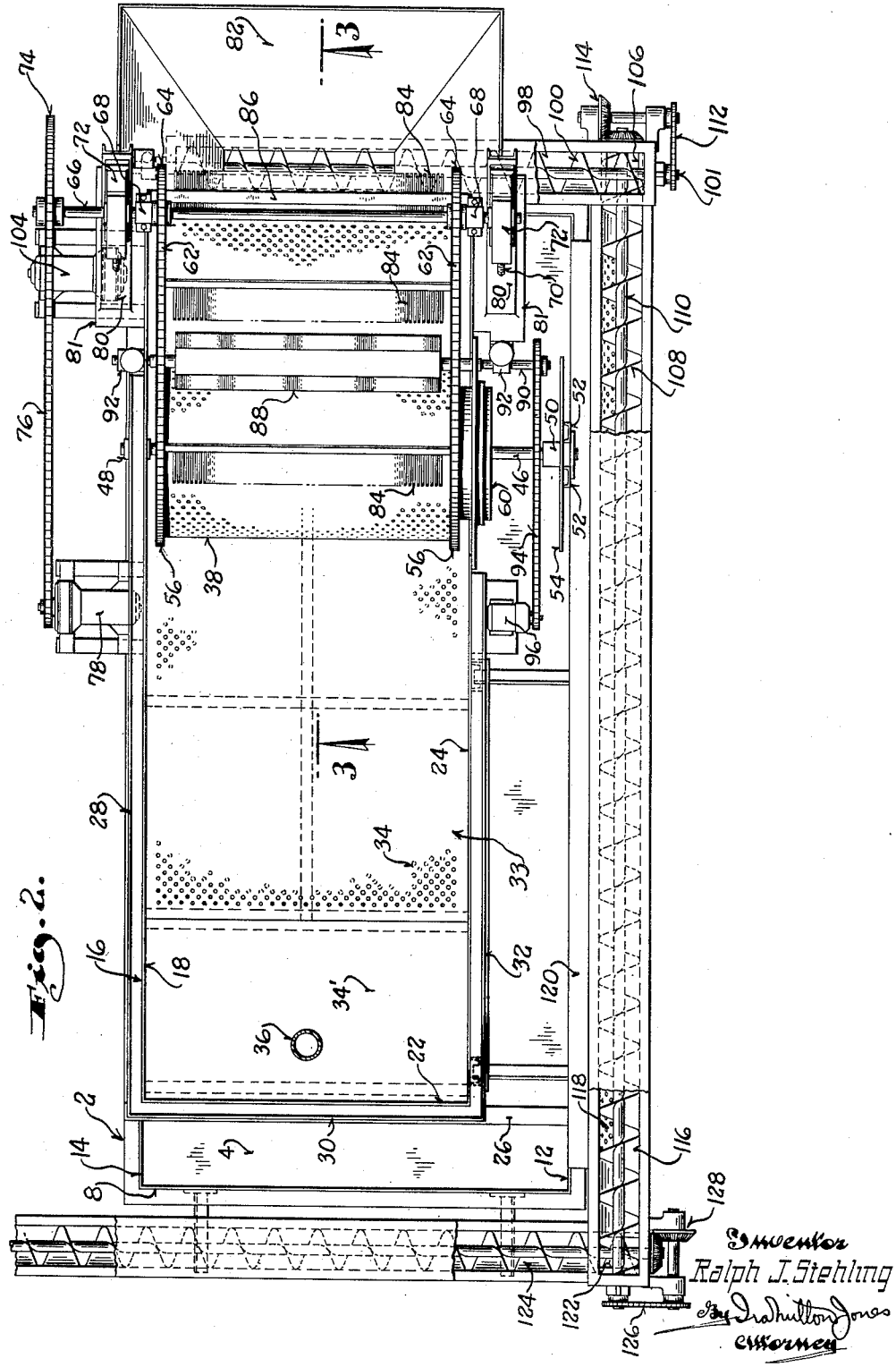

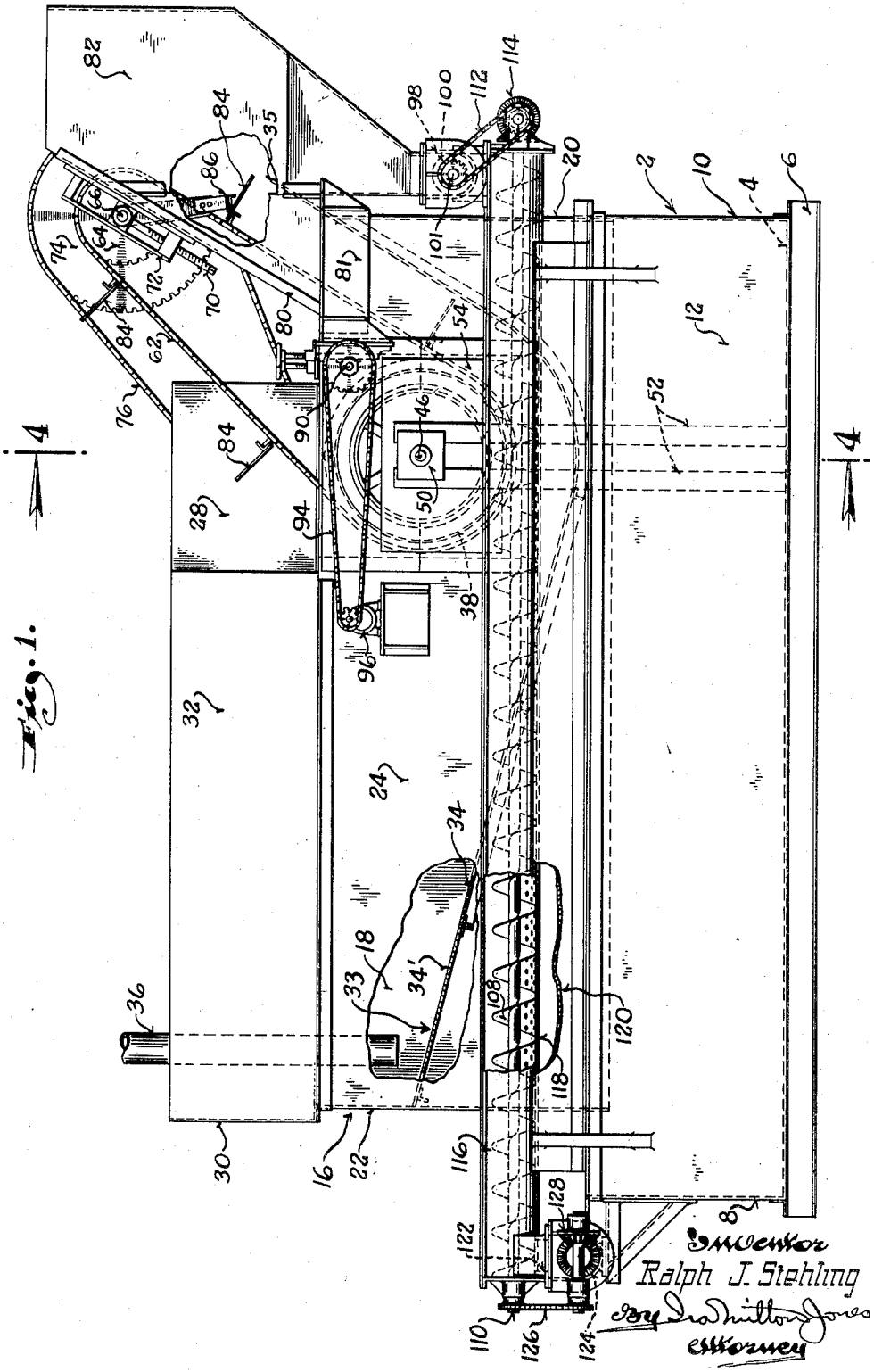

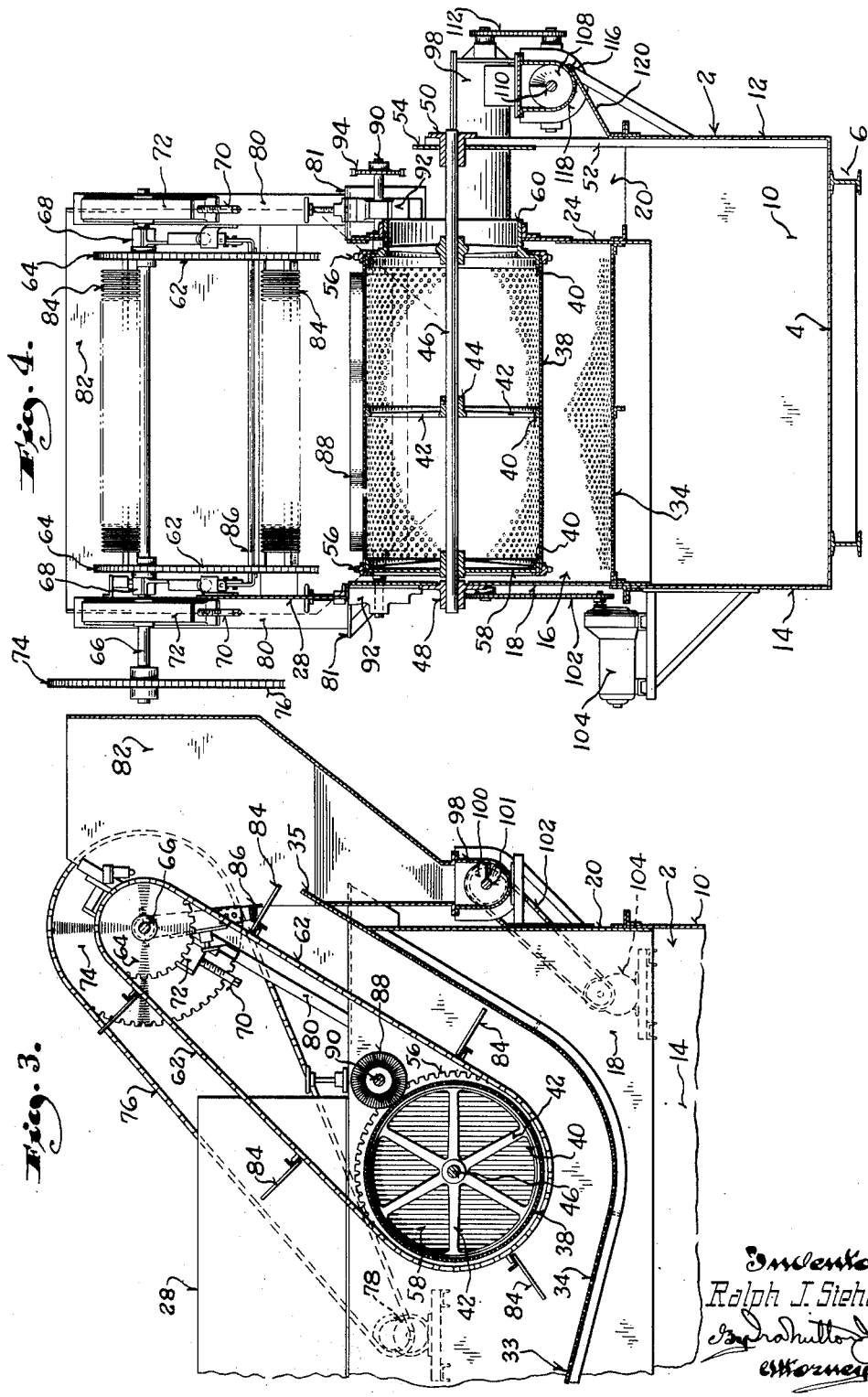

Patented Sept. 1, 1953

2,650,710

UNITED STATES PATENT OFFICE 2,650,710

MACHINE FOR REMOVING DEBRIS FROM SOLUTIONS

Ralph J. Stehling, Mequon, Wis., assignor to Chas. H. Stehling Company, Milwaukee, Wis., a corporation of Wisconsin Application January 24, 1951, Serial No. 207,502

1 Claim. (Cl. 210—151)

This invention relates to devices for separating solids from liquids and, more particularly, to a machine for recovering caustic solution after its use for soaking and washing purposes.

The object of the invention is to provide a machine having particular utility in the processes of bottle washing. Immediately prior to the step in which this machine comes into play, the bottles are soaked in a strong caustic solution to remove the labels, stickers and seals from their outsides, and to dislodge debris from the inside. While the washing solution, as it discharges from the soaker, retains most of its original chemical properties it also carries out a conglomeration of paper, foil, broken glass, tobacco and other solids which must be removed before the solution can be recycled. The machine of this invention not only separates all these solids from the caustic solution, but also squeezes from the solids every last possible bit of the solution, and does so in a manner to recover substantially all of the solution while compacting the solids to an almost dry, easily disposable mass.

More specifically, the machine of this invention incorporates mechanism which utilizes, in their most favorable order of succession, the principles of primarily gravitational drainage and progressively increasing compression of the solids for recovering the chemical solution from the solids and for compacting the solids into a dry cakey mass of small particle size.

In furtherance of these objects the invention contemplates a machine having a relatively large, elongated tank with an inclined, perforated false bottom along which the debris passes by gravity to the exterior of a revolving cylindrical screen discharging into the bottom of the tank as does all the liquid passing through the perforated bottom. From the revolving screen, the debris is pushed by an elevating conveyor along another more steeply inclined perforated false bottom, lifted up and over the end of the tank, and discharged via a hopper into a laterally running screw conveyor which feeds the loose, wet mass to a long screw running lengthwise alongside the tank. By the time the loose mass starts along the long screw conveyor, most of the easily-extractible solution has been drained and gently squeezed out, the rest of the extractible solution being squeezed out as the mass is advanced by the long screw. While relatively high pressures are ultimately exerted on the well-drained mass of debris, one of the features of the machine is that it embodies no high-pressure liquid lines or housings so that the parts can be made relatively inexpensively, and so that its operation will be safe and neat.

A further object of the invention is to drain the solution extracted by the conveyor screw back into the tank through perforations in the screw housing and to discharge this solution directly into the bottom of the tank and thereby avoid remixture with the debris-ridden solution then passing through the first stages of separation along the perforated false bottom.

With the above and other objects in view, which will appear as the description proceeds, this invention resides in the novel construction, combination and arrangement of parts, substantially as hereinafter described and more particularly defined by the appended claim, it being understood that such changes in the precise embodiment of the herein disclosed invention may be made as come within the scope of the claim.

The accompanying drawings illustrate one complete example of the physical embodiment of the invention constructed according to the best mode so far devised for the practical application of the principles thereof, and in which:

Figure 1 is a side view of the machine of this invention, with parts broken away to illustrate details;

Figure 2 is a plan view, also broken away in part, of the machine shown in Figure 1;

Figure 3 is a vertical cross sectional view taken lengthwise through part of the machine along the line 3—3 of Figure 2; and Figure 4 is a vertical cross section taken transversely through the machine along the line 4—4 of Figure 1.

Referring now to the drawings, in which like reference numerals are used throughout all the figures to denote the same or similar elements, the tank indicated generally at 2 is formed of suitable plate or sheet metal and includes a bottom 4 resting on a base 6 and comparatively low front, rear, and opposed side walls 8, 10, 12 and 14, respectively.

Occupying most of the upper portion of the tank 2 is a receiving chamber denoted generally at 16 having one side wall 18 and a rear end wall 20 extending upwardly from and almost coplanar with the corresponding walls of the tank 2. The front end wall 22 and the other side wall 24 of the receiving chamber which are spaced inwardly from the corresponding tank walls, rest upon a transverse beam 26 extending between the side walls of the tank, and splash boards 28, 30, 32 extend the effective height of the receiving chamber.

The receiving chamber 16, which may be considered as an upper story of tank 2, is characterized chiefly by its converging bottom 33, the rear portion of which is inclined at a far steeper angle than its front portion 34. The bottom 33 is perforated, except at its extreme front end where it provides an imperforate apron 34' and at its extreme rear end where it provides a discharge lip 35. It is thus apparent that when the debris laden caustic solution enters through an inlet pipe 36 positioned to discharge onto the apron 34', it first impinges upon the apron and then slides along the downwardly and rearwardly inclined perforate bottom 34, meanwhile draining a large part of the solution downwardly into tank 2.

Over the nadir of the bottom 33, a cylindrical screen 38 is rotatably mounted so as to roll against the slushy conglomerate therebeneath. As shown best in Figures 3 and 4, this screen 38 is spread around hoops 40, the latter being supported on the outer ends of spokes 42 radiating from hubs 44 affixed on a shaft 46. The ends of the shaft 46 are rotatably supported in bearings 48, 50, the former of which is mounted through the receiving chamber wall 18, and the latter of which is supported on stanchions 52 behind a splash plate 54. A sprocket 56 encircles each end of the screen 38, and it should be noted particularly that one end thereof is closed by a wall 58 while its other end 60 is open and flanged so as to discharge through an opening in the side wall 24 of the receiving chamber directly into the tank 2.

The cylindrical screen is driven counterclockwise, as seen in Figures 1 and 3, by chains 62 meshing with the sprockets 56 and also driving sprockets 64 fixed on a cross shaft 66. The shaft 66 is rotatably supported in bearings 68 mounted for chain-tensioning adjustment by a screw and slide arrangement 70, 72 and is in turn rotated by a large sprocket and chain 74, 76 driven by a motor 78.

The chain take-up slides 72 are supported on modified A frames 80 having bases 81 affixed to the sides of the receiving chamber 16. These frames also support a hopper 82 in position to receive material pushed off the discharge lip 35 at the adjacent rear end of the bottom 33. Comb-like flights 84 on and extending between the chains 62 sweep the debris from beneath the revolving cylindrical screen 38, push it up the steeply inclined perforated rear end portion of the bottom 34, and shove most of it over the lip 35 into the hopper 82. A free hanging scraper 86, which is like that shown in Patent No. 1,769,655 and thus forms no part of this invention, removes the material remaining on flights 84 as they pass, while a nylon brush 88 rotating against cylindrical screen 38 clears the perforations therein as they pass. The drive shaft 90 of brush 88 is rotatably mounted in pillow blocks 92 adjustably mounted on the sides of the receiving chamber 16 so that hardness of the brushing action against the cylindrical screen may be varied and wear on the brush accommodated. A chain and sprocket drive 94 drivingly connects the brush shaft 90 with a motor 96 supported on the outer side of the receiving chamber 16.

Since the caustic solution drains freely from the debris as it is elevated toward the discharge lip 35, the debris reaching the hopper 82 will be wet and quite soggy, but not slushy enough to squirt when compressed. In fact, the largest part of the caustic solution will have been extracted first by running off through the perforations of the bottom 33, and then by the pressing action of the cylindrical screen 38. The debris entering the hopper 82, however, still contains a valuable quantity of the solution to be recovered and the debris would still be difficult to dispose of. Further compression of the debris is thus in order.

To this end the hopper 82 discharges into the casing 98 of a screw conveyor 100 extending horizontally along the rear wall 20 of the receiving chamber 16. This conveyor is driven through a chain and sprocket drive 102 by motor 104 mounted externally on the rear wall 14 of the tank 2, and is rotated so as to feed the soggy debris through a downwardly facing opening 106 at its output end into the input end of an elongated screw conveyor 108, the shafts 101 and 110 of the screw conveyors being connected through chain and sprocket and bevel gear drives 112 and 114, respectively.

The screw conveyor 108 runs in a casing 116 supported outwardly from and somewhat above the side 12 of the tank 2. The lower inner portion of the casing 116 is perforate, as indicated at 118 so that the caustic solution pressed from the debris by the screw 108 drains downwardly via a trough 120 back into the tank 2. The great length of the screw conveyor 108 results in a gradual compacting of the debris as it progresses towards the outlet opening 122 at its discharge end, and the arrangement of the conveyor, its perforated casing 118 and the trough 120 above and alongside the tank 2 results in a direct return of the expressed caustic solution to the common pool of collection in the tank, from which it is pumped by a suitable system, not shown, to a vessel for reheating and re-cycling.

The now substantially dry and compacted debris drops from conveyor outlet 122 to an output screw conveyor 124 supported along the front end of the tank 2, and driven through a chain and bevel gear drives 126 and 128 respectively. While the output end of conveyor 124 is not shown, it will be understood that the cakey mass may be discharged therefrom directly into a waiting truck or other conventional vehicle and hauled away.

From the foregoing description taken in connection with the accompanying drawings and the following claims, it will be readily apparent to those skilled in this art that the machine of this invention is capable of handling large volumes of caustic solution and that its operation is simple and direct so that ordinary semi-skilled help is fully capable of running the machine; and that the operation is continuous as distinguished from the batch method heretofore employed in which the debris laden solution was discharged into large setting tanks, in which the solution stood for a relatively long time to allow gravity drainage and from which the debris had to be manually removed.

What I claim as my invention is:

In a machine for removing debris from liquid; means defining elongated superimposed tanks, the lower tank providing a collecting chamber for liquid from which debris has been removed, and the upper tank having a fixed perforate bottom wall sloping downwardly from its front and rear ends to define a perforate transverse trough near the rear of the machine, said upper tank providing a receiving and draining chamber separate from the collecting chamber, and all portions of its perforate bottom wall being spaced a substantial distance above the bottom of the lower tank so as to be above the normal level of debris-free liquid collected therein, whereby liquid may drain from debris-laden liquid fed into the front end portion of the upper tank and fall into the collecting chamber, while debris rolls downwardly and rearwardly along said perforate bottom wall and into said trough; a substantially cylindrical rotary screen in the receiving and draining chamber extending transversely thereacross directly over said trough with its periphery spaced a short distance above the bottom of the trough, one end of said screen being closed and its opposite end being in open communication with the collecting chamber so that liquid in the trough may drain into the collecting chamber through said screen; means for rotating the screen to roll-press debris between its periphery and the bottom of the trough; means for pushing the roll-pressed debris out of said trough up the rear portion of said perforate bottom wall and out of the rear of the receiving and draining chamber; a hopper on the rear of the machine to receive the roll-pressed debris thus discharged from the receiving and draining chamber; elongated screw conveyor means extending along one entire side of the machine at its exterior and including a casing having an inlet at the rear of the machine and an outlet adjacent to the front of the machine, said casing having a perforate bottom; means on the rear of the machine beneath the hopper for conducting roll-pressed debris therefrom into the inlet of the screw conveyor casing so that liquid will be expelled from debris acted upon by the screw conveyor means and will issue through the perforate bottom of its casing; and trough means on the side of the machine under said casing to conduct such expelled liquid into the collecting chamber.

RALPH J. STEHLING.

References Cited in the file of this patent

UNITED STATES PATENTS

| Number | Name | Date |
|---|---|---|
| 420,148 | Dunn et al. | Jan. 28, 1890 |
| 1,235,672 | Fitch et al. | Aug. 7, 1917 |
| 1,627,550 | Bachmann | May 10, 1927 |
| 2,074,788 | Holloman et al. | Mar. 23, 1937 |
| 2,471,517 | Chaffee | May 31, 1949 |

FOREIGN PATENTS

| Number | Country | Date |
|---|---|---|
| 590,659 | Germany | Jan. 8, 1934 |